Patented May 20, 1947

2,420,815

UNITED STATES PATENT OFFICE 2,420,815

PROCESS OF PRODUCING EXPANDED RUBBER MATERIAL

Lester Cooper, Milford, Conn., and Hans Pfleumer, New Brunswick, N. J., assignors to Rubatex Products, Inc., New York, N. Y., a corporation of Delaware No Drawing. Application June 18, 1946, Serial No. 677,534

1 Claim. (Cl. 18—48)

This application is a continuation in part of our application Serial No. 599,515, filed June 14, 1945.

Our present invention relates to cellular rubber or similar material of the closed cell type having a multiplicity of minute non-communicating individual cells, and more particularly to a method for decreasing the weight and density of the cellular board and decreasing the internal gas pressure within the cells.

More specifically, our invention relates to a method for making such cellular material of substantially lighter density than has hitherto been obtained by the novel step of subjecting the material to a vacuum in the presence of heat at specific stages in the process of manufacture.

The type of closed cell cellular material to which our invention relates is generally described in Patent No. Re. 21,245 and Patent No. 2,299,593.

Essentially, as shown in these patents, the closed cell cellular material is preferably a rubber material or is composed of what are commonly known as rubber substitutes including neoprene and the like.

The finished product is characterized by a multiplicity of minute gas-filled cells which are substantially non-communicating. The end result is an extremely light heat insulating buoyant material.

In the foregoing patents, methods for making both soft and hard cellular material have been described. In soft material, the expansion processes result in the "blowing" of the internal gas to produce the multiplicity of cells. When the product is complete, the pressure of the gas within the cells causes these cells to expand to a point where this pressure is counteracted by atmospheric pressure plus the elasticity of the rubber itself. The pressure of the gas within the cells of soft material is slightly above atmospheric, depending upon the contractive force of the compound.

In the hard cellular board, the gas pressure within the cells is manifested solely by the degree of expansion. That is, since the rubber is hardened in the process, and the cell walls thus acquire structural rigidity, there will be no contraction of the product after it is completed.

Previously it has been found that with optimum expansion, the hard board material may be as light as about four pounds per cubic foot.

The various advantages of this material and the many actual and projected uses thereof have been described in the aforementioned patents.

Our process contemplates an additional step which will produce a much lighter material than that produced by the previous processes wherein a hard board may be produced having a density of between 3 to 3½ pounds.

Previous processes described in the above patents for manufacturing this type of material have been characterized by two major but not necessarily divergent methods. These are (1) the external "blow"; (2) the internal "blow"; and a process which (3) combines both the external and internal "blow" has been used.

Essentially the external "blow" consists of subjecting a rubber mix to sufficient heat to partially vulcanize or pre-set the rubber to impart some strength thereto; placing the rubber mix thus treated into an autoclave and admitting an inert gas, such as nitrogen, under pressure of the order of 3,000 to 5,000 pounds per square inch into the autoclave. These first and second steps may be done simultaneously.

The nitrogen under this excess pressure permeates the rubber. When the rubber has been subjected to the above gas pressure for a sufficient time to allow full impregnation, the external gas pressure within the autoclave is released.

Since the internal pressure of the nitrogen within the rubber remains at the elevated pressure, the differential between external and internal pressure causes a rapid expansion of the gases within the rubber, causing a rapid expansion of the rubber itself.

Since the rubber has been given a partial pre-set sufficient to impart some strength thereto without materially decreasing its ability to expand, the minute bubbles of gas as they expand form proportionately minute cells within the rubber and the cell walls have sufficient strength to remain substantially intact.

The size of the mold is predetermined so that a specific quantity of rubber placed therein will expand to a specific degree. It has been found that this expansion may be made to occur to a point where the density of the material in the hard board form will be of the order of 4 pounds per cubic foot. In the soft closed cell cellular rubber the same initial expansion may occur, but the elasticity of the rubber will cause contraction on cooling.

When the full expansion is reached, then the final vulcanizing heat is applied to the rubber to set the rubber in its expanded form.

The internal "blow" simply provides a way of getting the nitrogen or other "blowing" gas into the rubber without the necessity for external gas pressure. In the internal gas "blow" described in Patent No. 2,299,593, a chemical, which on application of heat will decompose into a "blowing" gas such as nitrogen, is finely mixed with the rubber mix. The rubber mix is placed into a mold substantially filled and subjected to heat. When the mix has been partially set by heat and the blowing chemical decomposed (thereby evolving blowing gas in a confined space at high pressure) the counter-pressure exerted on the filled mold is released; then the partially cured rubber "pops" out of the precure mold and expands in three dimensions. When the "blow" has occurred the precured rubber is loaded in a final cure mold and the final vulcanizing heat is applied to set the rubber in its expanded form.

In the third process, using a combination of both the internal and external "blow," complex and costly apparatus results in limited production.

In this type of "blow," a "blowing" chemical is mixed with the rubber mix. The mix is placed in an autoclave and subjected to the pre-curing stage, while the autoclave is filled with a gas, such as nitrogen, at an elevated pressure. The temperature is then raised to that at which the chemical "blow" will occur, and at the same time the external nitrogen gas pressure is released thus causing a "blow" by reason of the evolution of gases from the chemicals within the rubber and the expansion of the external gases which have permeated through the rubber.

After the expansion has occurred, the vulcanizing heat is applied for the necessary time to set the rubber in expanded form.

A primary object of our invention is the formation of a closed cell cellular hard rubber or similar material having a density substantially less than 4 pounds per cubic foot.

Another and corollary object of our invention is the formation of a closed cell cellular rubber material utilizing a separate and independent step of subjecting the material to a partial vacuum after it has been blown in order to obtain additional expansion thereof.

Another object of our invention is the provision of a method for additionally expanding hard closed cell rubber or similar material after the same has been manufactured.

Our invention further contemplates a process whereby the closed cell cellular material may be changed in shape while undergoing the vacuum treatment.

Our invention also contemplates the utilization of various means hereinafter described to reinforce the expanded rubber without substantially increasing the weight thereof so that even at substantially low (below atmospheric) pressures within the cells, the rubber will not collapse even though the differential between the pressure within the cells and the external atmospheric pressure would otherwise be sufficient to collapse the rubber.

These and many other objects will become apparent in the following detailed description.

Our invention contemplates an additional step over and above the internal or external "blow" or combination thereof which will further expand the rubber or similar cellular material. This step comprises placing the material under vacuum after it has been fully blown and maintaining the plasticizing heat so that the rubber may stretch further without breaking. The placing of the material under a fairly high vacuum, creates once more a pressure differential between the gas within the cells and the exterior of the mass of rubber.

Since the gas within the cells may be at just about, or perhaps even slightly above, atmospheric pressure, subjecting the "blown" material to a vacuum of, for instance, the order of 25 to 29 inches of mercury will create a sufficient pressure differential to cause further expansion of the rubber.

When the expansion has occurred, owing to the vacuum and heat, the rubber is immediately chilled in order to rigidify it once more, after which it may be removed from the partial vacuum in expanded form.

Our process is applicable to hard closed cell cellular rubber rather than to soft closed cell cellular rubber, the reason being the structural strength of the cell walls of hard rubber which is sufficient even for cellular structures whose internal gas pressure is below the external atmosphere.

Various additional means may be incorporated, as will hereinafter be pointed out, to assist in supporting the rubber in its expanded state, even though the internal cells may be under reduced pressure.

Thus, in the case of hard rubber, a permanent increase in size and consequent decrease in density occurs. In the case of soft rubber, the additional stretching of the cell walls in the plastic state and then chilling of the cell walls after the material has been expanded increases the size of the soft rubber (after it has been withdrawn from the vacuum) only to a slight extent.

The elasticity of the soft rubber will permit it once more to contact to a point where equilibrium is established between the gas pressure in the cells on the one hand and the external atmospheric pressure plus the elasticity of the rubber on the other hand.

Although our process finds its most successful application as an additional step in the manufacture of hard board, it was originally devised for the treatment of already manufactured hard board, and we have found that our process may be successfully applied to hard board material which is a week old.

Our vacuum-blow process is preferably employed in connection with the finishing cure following the chemical blow step.

The utilization of our vacuum blow step immediately after the completion of the final blow is the preferred and economical step since the rubber is given an increased expansion without the necessity for a reheating or replasticizing operation and re-cooling. Our process permits of a decrease of platen press time over the regular finishing cure because by virtue of the vacuum immediate contact is made between rubber and mold. Moreover, molds may be designed which can be "pulled hot" from the press to be placed into refrigeration, thus freeing the press. Cooling and heating the press at each load is thereby avoided.

In the production of a super-expanded hard board material, the hard board closed cell cellular material is formed first by either of the processes described in Patent No. Re. 21,245 or in Patent No. 2,299,593 or by combination of those processes.

One way of vacuum-blowing a hard board is as follows:

After the hard board material is thus completed to the maximum expansion and minimum density obtained by either of the foregoing processes, we place the hard board material in a mold which is larger in all three dimensions than the board itself and which has an internal size equal to that which the completed board is to assume.

We plasticize the board by heat so that the material thereof may stretch without tearing, and then draw a vacuum in the mold to expand the board until it fills the mold.

After the board has filled the mold, the outlet through which the vacuum is drawn is closed. The mold is then cooled. The board cannot, of course, contract to any perceptible extent while it is being cooled within the mold, since any movement of the surface of the board away from the interior surface of the mold would create a higher vacuum at that point resisting such contraction.

The cooling of the board within the mold, however, results in a very slight loosening of the surface of the board from the surface of the mold so that the board may readily be withdrawn.

When the mold is cooled, the board is found to be reset in its super-expanded stage, and the board may now be withdrawn without any perceptible contraction from the maximum expanded condition which it has attained within the mold.

In the original manufacture of hard cell-tight cellular rubber board the outer cells bear against the mold, forming a heavy skin. This hard skin, which may be of the order of 1/64 to 1/32 of an inch in thickness, is not provided with any minute cells—and consequently does not expand under the vacuum blow. However, if the board is given our final treatment when the skin is in place, the skin has been found to break at various points, or an irregular expanded product is formed.

The optimum of light density of a hard cell-tight cellular rubber board which had been completed by the regular finishing cure can be had by removing the dense skin on both sides and vacuum blow it as previously described.

As the rubber is expanded and heated, rubber is now forced against the heated mold wall, and a new thin skin will be formed.

It should be understood that our process is completely distinct and entirely different from prior processes which produce simple expanded board.

In previous practice of external blow method a partial vacuum was exerted in the autoclave before the admission of nitrogen to remove the contaminating air. At the end of the gassing cycle a partial vacuum was again exerted in the autoclave to recover all nitrogen possible. Upon removal of the rubber from the autoclave the rubber was loaded into a final cure mold under atmospheric, and not sub-atmospheric, pressure.

Our process is intended to take place after the final blow of the aforementioned processes. Our process is utilized over and above such final step in the prior processes.

Various types of molds and various kinds of apparatus may be used in the manufacture of our vacuum blow low density hard rubber board. Generally, however, the final vacuum blow mold should preferably be a light metal mold in order to apply the heat uniformly throughout the board without damaging or bursting the outermost layer of cells before the surfaces of the board abut against the inner surfaces of the mold.

The vacuum chamber mold may even be ice cold when the heated and plasticized board is placed therein, since it only takes a very short time to draw the vacuum and expand the plasticized board to its full size to fill the mold.

Thereafter, the mold containing the super-expanded board should be refrigerated to cool off the cell structure. This cooling may be extended as long as necessary to set the expanded board.

When the board is removed from the vacuum mold, although now it contains less than atmospheric pressure in its cells and is of utmost low density, it will not collapse because the rubber has been given ample time to regain its original compressive strength.

It may be necessary, when boards of an expansion resisting composition are to be super-blown, to vary the process slightly. That is, instead of placing the heated board into a chilled mold and instead of starting the cooling immediately after expansion, the pre-heated board is placed into a pre-heated vacuum mold, and the mold then is placed into a heated platen press to effect fullest expansion. The mold containing the rubber is squeezed tight and the rubber brought to high heat. Thereupon, the vacuum is pulled until the rubber fills the mold space.

A valve on the mold may then be closed to hold the external pressure back and keep the internal board expanded; then the mold containing the hot and expanded board can be safely removed from the press without coming apart by virtue of the fact that the outer atmosphere holds the mold plates together. The mold with the rubber is now refrigerated as described before.

In one method for practising our process a rubber mix containing a chemical blowing agent is treated in the known way of confining the compound in a strong mold between heated platens, the temperature being sufficient to precure and blow the agent in approximately the same time interval. The internal cell pressure developed ranges between 1,000 and 1,500 pounds per square inch and consequently the expansion upon release may be from 4 to 8 times the original volume.

For the regular finishing cure the above-described precure would have to be placed into a mold only slightly larger to produce a board of uniform structure. The cell pressure developed during the finishing cure will range between 20 to 60 pounds per square inch according to compound and the optimum light density may be reached with 4 to 5 pounds per cubic foot.

For the vacuum blow finishing cure the mold is chosen much larger and upon preheating the expanded precure it is immediately expanded further by means of a partial vacuum to make contact with the mold. The internal cell-pressure as measured by an external gage may be as low as 15 inches mercury, yet sufficient to mold the board. The mold remains sealed while it is subjected to vulcanizing heat and is provided with a valve which will permit air to exhaust therefrom, but not enter.

After the vulcanizing heat has been maintained for a sufficient period to vulcanize the rubber, the mold with its fully vacuum blown expanded rubber content may be withdrawn hot from the press and thoroughly chilled as previously described.

The use of a special gasket-sealed mold, as will be obvious, makes it possible to draw the mold containing the rubber hot so that the press may immediately be re-used without being first cooled down and heated up.

The mold must be chilled before the rubber is withdrawn therefrom to give the rubber an opportunity to harden into the hard structurally strong condition which will permit the hard rubber cell walls to support the structure throughout despite the low internal pressure.

On chilling, when the rubber is finally withdrawn from the mold, the hard rubber thus formed therein is found to have a density of the order of 3 to 3½ pounds per cubic foot, which is a vast improvement over prior products and processes.

We have found that hard cell-tight cellular rubber board may be reinforced—increasing the density only slightly—where it is desirable to combine lightness with strength. The reinforcement may comprise a skeleton of transverse ribs or partitions which are integrated with the cellular rubber at the time of the super-blow. To effect this, the board to be treated is divided into several equal parts say, for instance, eight; the cut edges are provided with a coat of Bakelite which will stiffen into a hard wall when heated and cooled. The pieces may now be assembled into the former board and pre-heated preparatory to vacuum treatment. When the board is finished, the cement constitutes a strong, non-collapsible, partition within the cellular rubber.

Another way of reinforcing the hard board includes the preparation of a multiple partition of a suitable material as, for instance, heat-resisting sheet. This partition may be formed in a manner similar to that in which egg-box partitions are formed. In addition, however, we may punch openings through the solid surfaces of the partitions. This will reduce the weight and the expanding rubber may flow into the holes and weld together. As before, Bakelite cement is applied to the rubber.

The exterior of the board may be advantageously strengthened by lining the mold with heavy but fine-mesh wire screen. The impression of the same causes a corrugated surface of greater resistance to compression. The screen is of course removed from the finished board.

The vacuum blow process of our invention may be utilized where necessary to even change the shape of the manufactured article. Assuming, for instance, that hexagonal bars are required to fill a pontoon, and also assuming that it is simpler in the original manufacturing process to manufacture cylindrical bars—the cut cylindrical bars may then be placed in a hexagonal tube mold and vacuum blown by the process herein described to a further expanded hexagonal cross section—thus changing the shape of the original bar to a desired shape and increasing the expansion and decreasing the density.

In the foregoing we have set forth our invention only in connection with specific steps and specific examples and uses. Many other methods and uses within the limit of the foregoing description should now be obvious to those skilled in the art. Accordingly, we prefer to be bound not by the specific disclosures herein, but only by the appended claim.

We claim:

In the process of manufacture of an extremely light hard rubber material having a multiplicity of closed non-communicating cells, the steps of subjecting a board made of such material and having a multiplicity of gas-filled closed non-communicating cells to heat sufficient to plasticize the same, subjecting the plasticized board to a vacuum to expand the same while in plasticized condition and chilling the expanded board while the same is subject to said vacuum.

LESTER COOPER.
HANS PFLEUMER.